3,591,449
COKING AND OXIDIZING OF WASTE LIQUORS
Howard V. Hess, Glenham, and Edward L. Cole, Fishkill, N.Y., assignors to Texaco Inc., New York, N.Y.
Filed Nov. 29, 1968, Ser. No. 780,078
The portion of the term of the patent subsequent to Apr. 21, 1987, has been disclaimed
Int. Cl. D21c *11/12*
U.S. Cl. 162—30                                                      7 Claims

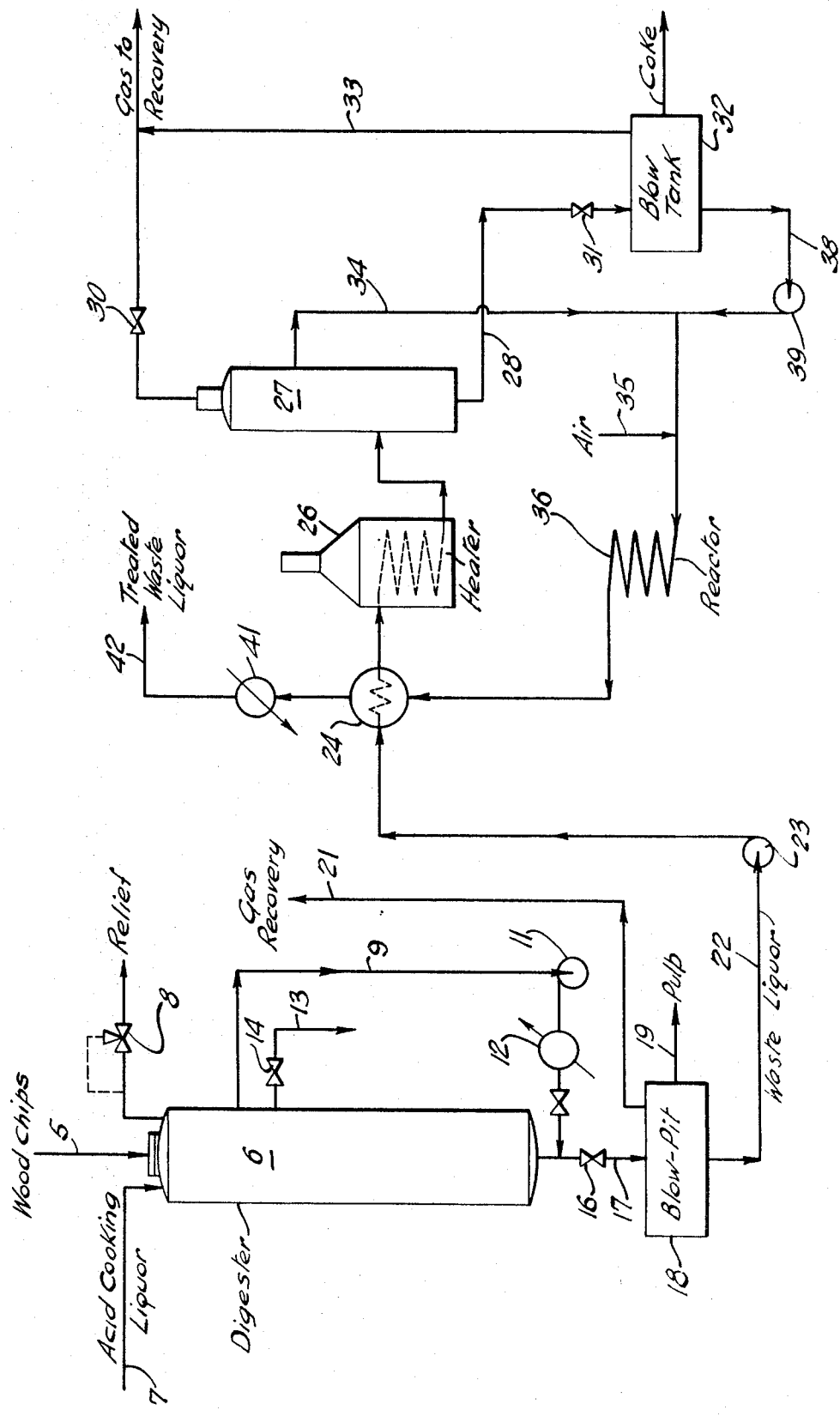

ABSTRACT OF THE DISCLOSURE

A process for treating aqueous organic waste liquor including the steps of coking the waste liquor, in the absence of free oxygen, thereby forming a coke-containing aqueous slurry, steam, gases, and an effluent, separating aqueous liquid from said slurry and combining said aqueous liquid with said effluent, and air-oxidizing the thus combined liquids to yield a hot effluent having a reduced chemical oxygen demand.

---

This invention relates to a process for treatment of aqueous industrial organic wastes.

The process of this invention effects removal of organic matter from aqueous organic waste liquor by carbonization of said organic matter contained in said waste liquor with heat under elevated pressure and in the absence of free oxygen. In one of its more specific aspects, the process of this invention comprises heating an aqueous organic waste liquor to a temperature in the range of 400 to 700° F. at a pressure in the range of 300 to 3200 p.s.i.g. for a period of one-half minute to six hours to form a granular solid coke which is separated from the aqueous phase to yield an aqueous effluent of low chemical oxygen demand (COD). The term "coke" is used herein in its broad sense to denote a water insoluble carbonized solid residue of substantially reduced hydroxyl group content as compared with the organic material in the feed to the process.

In the production of pulp and paper, wood is treated with chemicals to remove lignin binder from the cellulose fibers of the wood. In the process, about one-half the dry weight of the tree processed is dissolved in the pulping liquor and only about half recovered as pulp. The soluble portion, most of which is discarded as waste in the sulfite pulping process, presents a serious disposal problem. According to recent reports in the trade literature, sulfite liquor from over 100 pulp mills in the United States and Canada is disposed of by pumping the waste liquor into the nearest river or other body of water. Legislation in many states now prohibits the discharge of sulfite waste liquor into streams, resulting in efforts by mills to find the best method of utilizing or disposing of the waste liquor.

Reports in the trade literature indicate that some sulfite mills will be forced to discontinue the sulfite pulping process altogether because of the current costs of disposing of waste liquor without excessive stream or air pollution. A recent estimate indicates that the paper industry will be required to spend some 166 million dollars more per year for added treatment costs of process waste water to meet the requirements of the currently proposed interstate water quality control standards.

Similar problems are encountered in the disposal of cannery waste liquors.

It is an object of this invention to provide an improved method for the treatment of aqueous organic waste liquors economically to produce an effluent water which may be discharged into streams without excessive pollution and at the same time to avoid problems of air pollution which result from other methods of treatment.

The process is described herein in detail as applied to the treatment of sulfite pulp process waste liquor. Paper pulp is produced by three principal processes, namely the kraft or sulfide process, the sulfite process, and the soda process. The soda process uses sodium hydroxide to dissolve non-cellulose materials from the wood, while the sulfite process utilizes an acid cooking liquor. The kraft or sulfide pulping process employs a mixture of sodium hydroxide and sodium sulfide.

Acid cooking liquor for the sulfite process is usually prepared by the reaction between sulfur dioxide and limestone in the presence of water forming calcium bisulfite $Ca(HSO_3)_2$. Instead of limestone, which forms a calcium based sulfite acid liquor, the acid cooking liquor may be prepared from ammonium carbonate, ammonium hydroxide magnesium carbonate, magnesium hydroxide, or the carbonate, bicarbonate, sulfite or hydroxide of sodium. In some systems, dolomitic lime is used in place of high-calcium lime. Dolomitic limestone, containing normally 54% $CaCO_3$ and 46% $MgCO_3$, reacts readily with sulfur dioxide to produce mixed bisulfites of calcium and magnesium. In the sulfite process, the cooking liquor composition typically contains 7% by weight $SO_2$ in which 4.5% is combined as sulfurous acid and 2.5% as alkali metal bisulfite.

The reactions which take place in the cooking process involve the formation of an ammonium or alkali metal salt of lignin sulfonic acid which is soluble and is dissolved out of the wood in the cooking process. Sufficient metallic ion (or alternatively the ammonium ion) to form the salt of lignin sulfonic acid must be present in the cooking process to produce high yield of pulp.

Various methods have been devised for disposing of waste liquor from sulfite pulp mills to avoid or diminish the stream pollution problem. One process involves concentrating the waste liquor to approximately 60 weight percent solid which permits the waste liquor to be burned for the production of power and for chemical recovery. The lime from calcium based sulfite liquors is not readily recovered because the calcium combines with the sulfur present in the evaporated waste liquor to form calcium sulfate which is discharged from the furnace as an ash. If magnesium is used as a base, however, the magnesium is converted into magnesium oxide when the waste liquor is evporated and burned so that the magnesium may be recovered as magnesium sulfite for reuse in the process. Details of such a process are described in the article by Hull, W. Q., Baker, R. E., and Rogers, C. E., Ind. Eng. Chem., 43, 2424–35 (1951). When the sulfite liquor is ammonia based, the ammonia is usually used up in the process and is not readily recovered.

Spent liquors from sulfite pulp plants may be processed in a fluid bed system which involves concentrating the waste liquor to about 60% solids by weights, suspending solid particles in a moving stream of hot air or steam and spraying the concentrated waste liquor into contact with the hot granular particles in the fluidized bed which is usually maintained at a temperature of about 1300° F. Such disposal processes usually create problems of air pollution resulting from liberation of gaseous sulfur compounds to the atmosphere or require large capital investments in sulfur recovery equipment.

The present process involves a novel method for treatment of organic waste liquors from said food canning plants and from sulfite pulp processes. In the process of this invention, aqueous organic liquor is heated in the absence of free oxygen to an elevated temperature in the range of 400 to 700° F., preferably 450 to 550° F., under sufficient pressure to prevent vaporization of the water and maintained at said elevated temperature and pressure for a period of time in the range of one-half minute to two hours, preferably one minute to one hour sufficient to produce granular coke. Solid coke is separated from resulting aqueous liquid, hereinafter termed "treated waste liquor" which may be fed direct into streams without serious water pollution or subjected to non-catalytic air oxidation at substantially the same temperature and pressure conditions as for coking thereby effecting further reduction in the COD and the aqueous effluent discharged into streams without significant stream pollution.

The process of the invention will be better understood by reference to the accompanying figure illustrating diagramamtically a preferred embodiment of the present invention as applied to the treatment of waste liquor from a sulfite pulp mill.

With reference to the figure, wood chips from a suitable source of supply, such as fir, are introduced through line 5 into digester 6 where they are cooked in cooking liquor supplied through line 7. Generally the chips are processed at a temperature in the range of 265 to 300° F. at a pressure in the range of 70 to 100 p.s.i.g. for a period of 6 to 12 hours with a coking liquor containing typically 7 percent by weight $SO_2$ of which 4.5 percent is combined as sulfurous acid, and 2.5 percent as calcium bisulfite. The acid cooking liquor usually contains excess or uncombined sulfur dioxide as well. The digester is a large pressure vessel usually lined with acid proof brick or stainless steel.

After a charge of wood chips, usually amounting to several tons of wood, is introduced into the digester, the cooking acid is pumped in through line 7 while air is discharged from the upper part of the digester through a suitable relief valve 8 which also serves as a pressure limiting relief valve during the cooking process. When the digester has been charged with the cooking liquor, the cooking liquor is circulated through line 9 by pump 11 to heater 12, usually heated by steam, and reintroduced into the lower part of digester 6. The wood chips are gradually heated to a temperature of the order of 230° F., usually over a period of one to two hours after which the temperature is brought up to processing temperatures.

During the cooking process, the level of liquor in the digester is maintained below the top of the vessel by withdrawing some of the cooking liquor through line 13 as controlled by valve 14.

At the end of the cooking period, the contents of digester 6 are discharged through valve 16 and line 17 to blow pit 18 where wood pulp is separated from resulting waste liquor, the pulp being discharged through line 19 for further processing. At the end of the cooking period, the pressure in the digester is usually reduced to approximately 25 pounds per square inch gauge by withdrawal of gas and steam through valve 8 after which blow valve 16 at the bottom of the digester is opened and the contents discharged through line 17 into blow pit 18. Steam and gas released from the pulp during the blowing process are discharged through line 21 to a recovery system in which steam is condensed and sulfur dioxide is dissolved in water and recovered. Gases released from the relief valve 8 at the top of the digester during the cooking process are also treated for the recovery of sulfur dioxide which is returned to the system with the acid cooking liquor. It is to be understood that the process for cooking and digesting the wood chips, and the process for separating wood pulp from the waste liquor and recovery of waste gases from the digester effluents form no part of the present invention but are intended to be representative of conventional commercial operations.

In a preferred embodiment of the prsent invention, waste liquor is drawn from blow pit 18 through line 22 and passed by pump 23 through line 24 to a coking and oxygenation system for removal of dissolved organic materials as described more fully hereinafter.

In this specific example, the waste liquor is first passed from line 22 by pump 23 through a heater 24 where it is preheated by heat exchange with hot recycle liquor from a source described hereinafter. The preheated waste liquor is then fed into a fired heater 26 where the temperature of the waste liquor is raised to the desired coking temperature in he range of 400 to 650° F. at a pressure in the range of 300 to 350 p.s.i.g. sufficient to prevent vaporization of water. The hot waste liquor is then introduced into a separator 27 which is a large pressure vessel suitable for holding the heated waste liquor at the desired processing temperature and pressure, e.g. 500° F. and 825 p.s.i.g., preferably for a period of 20 minutes to 2 hours.

During the coking process, organic components of the waste liquor are converted to a carbonized solid, or coke. Combined oxygen in the sugars, acids, and other organic oxygen compounds is liberated as carbon dioxide and water by decarboxylation and dehydroxylation. Gas released during the coking process is discharged from separator 27 through relief valve 30 and processed for recovery of sulfur compounds.

Coke, or solid carbonized material, settles from the aqueous liquid and collects in the lower part of separator 27, from which it is discharged as an aqueous slurry, continuously or periodically, through line 28 and valve 31 to blow tank 32. Steam and gases released from the coke-containing effluent in blow tank 32 are discharged through line 33 to a suitable gas recovery system. Aqueous effluent is withdrawn from the upper part of separator 27 through line 34, mixed with air from line 35 and the mixture introduced into a tubular reactor 36 wherein residual organic compounds in the aqueous liquid are oxidized.

Aqueous liquid separated from coke in blow tank 32 is drawn through line 38 by pump 39 to reactor 36 for removal of residual organic compounds therefrom by oxidation with air. As shown in the flow diagram, the aqueous liquid is separated from the slurry in tank 32, passes through pump 39 and line 38 and is combined with the effluent in line 34 before the injection of air through line 35.

Generally the air oxidation reaction step is carried out under approximately the same temperature and pressure conditions as the coking process carried out in heater 26 and separator 27, i.e. at a temperature in the range of 400 to 650° F. and a pressure in the range of 300 to 3500 p.s.i.g. Preferred temperatures in the oxidation zone 36 are within the range of 550 to 650° F. at pressures in excess of the vapor pressure of water under the conditions prevailing in the reactor. The amount of air required for reaction with residual organic material in the aqueous effluent of the coking process is determined by the effectiveness of the coking process and the final COD required for the waste water. In general, 10 to 100 grams of air per liter of aqueous charge is sufficient for the cleanup of dissolved organic compounds in the aqueous effluents of the coking process as described herein. The time required for the air oxidation is generally within the range of one-half minute to ten minutes. A suitable average residence time for the effluents in the oxidation zone lies within the range of one minute to one hour.

Treated waste water leaving reactor 36 is passed through heat exchanger 24 where it is cooled, e.g., to a temperature of about 300° F., by indirect heat exchange with waste liquor from line 22 separated from pulp in blow pit 18. At the same time, the pulping waste liquor is heated to a temperature of about 450° F. The treated waste water is then further cooled by means of cooler 41 and discharged through line 42 to suitable waste water disposal or to recycle and reuse in the system.

In the processing of cannery waste liquors, the waste liquor is introduced to the system through line 22.

EXAMPLES

The following examples further illustrate the process of this invention for treatment of waste liquor from sulfite pulp processes. In Examples 1 to 11, waste liquor from an ammonia based sulfite process for wood pulping obtained from Rayonier Inc. was treated in batches under varying conditions of temperature and pressure. In each instance, sufficient pressure was maintained to prevent boiling of the water at the treating temperature. The ammonia based waste liquor had the following characteristics:

Sulfite waste liquor

| | |
|---|---|
| Carbon, wt. percent | 7.4 |
| Sulfur, wt. percent | 0.81 |
| Nitrogen, wt. percent | 0.35 |
| Carbon dioxide, wt. percent | 0.5 |
| Chemical oxygen demand g./l. | 210 |
| pH | 1 |

Dissolved solids

| | |
|---|---|
| Wt. percent of liquid | 13.5 |
| Analysis, wt. percent: | |
| Carbon | 51.4 |
| Sulfur | 5.4 |
| Hydrogen | 5.6 |
| Nitrogen | 2.8 |
| Carbon dioxide | 1.9 |

The sulfite waste liquor characterized above was treated under the various operating conditions and with the results indicated in Table 1.

TABLE 1

| Example No | 1 | 2 | 3 | 4 | 5 | 6 | 7 |
|---|---|---|---|---|---|---|---|
| Process conditions: | | | | | | | |
| Temperature, ° F | 350 | 400 | 450 | 500 | 550 | 600 | 650 |
| Pressure, p.s.i.g | 125 | 300 | 500 | 825 | 1,050 | 1,900 | 2,600 |
| Time, hrs | 2 | 2 | 2 | 2 | 2 | 2 | 2 |
| Product liquid: | | | | | | | |
| Feed, wt. percent | 98.9 | 87.0 | 88.6 | 89.0 | 87.2 | 88.0 | 88.1 |
| Dissolved solids, percent | 12.6 | 2.5 | 1.8 | 1.4 | 1.4 | 0.8 | 0.4 |
| COD, g. $O_2$/l.* | 204.0 | 20.8 | 10.4 | 9.3 | 15.9 | 14.1 | 14.7 |
| pH | | | | | 3 | | |
| Coke: | | | | | | | |
| Feed, wt. percent | 0.0 | 10.2 | 8.6 | 8.6 | 9.4 | 8.9 | 8.2 |
| Analysis, wt. percent: | | | | | | | |
| Carbon | 57.7 | 66.5 | 62.3 | 60.6 | 65.6 | 71.1 | |
| Sulfur | 6.9 | 5.3 | 6.0 | 6.8 | 5.4 | 4.6 | |
| Hydrogen | 5.0 | 4.0 | 4.1 | 3.9 | 3.6 | 3.5 | |
| Nitrogen | 3.0 | 3.0 | 2.7 | 2.7 | 3.1 | 3.1 | |
| Carbon dioxide | | 0.4 | 1.0 | 1.0 | 1.5 | 1.5 | |
| Ash, wt. percent | 3.3 | 5.7 | 9.6 | 8.0 | 5.0 | 4.3 | |
| Surface area, sq.m./g. | 86 | 9 | 27 | 170 | 186 | 228 | |
| Heating value B.t.u./lb. (×1,000) | 10.3 | 11.6 | 11.0 | 10.4 | | 11.6 | |
| Density | 1.426 | 1.404 | | | 1.526 | 1.517 | |
| Product gas: | | | | | | | |
| Analysis, mol percent: | | | | | | | |
| Carbon dioxide | 99.0 | 92.4 | 91.6 | 96.3 | 95.9 | 85.5 | 80.2 |
| Hydrogen sulfide | 0.4 | 5.5 | 4.5 | | | 0.7 | 8.2 |
| Hydrogen | 0.3 | 1.5 | 1.7 | 1.8 | 2.4 | 6.1 | 3.0 |
| Methyl mercaptan | | 0.4 | 2.0 | 1.5 | 1.5 | 5.1 | 5.8 |
| Methane | | | | | | 1.4 | 2.2 |
| Ethane | | | | | | 0.5 | 0.6 |
| Oxygen | 0.3 | 0.2 | 0.2 | 0.3 | 0.1 | 0.2 | |
| Dimethyl sulfide | | | | | 0.1 | 0.5 | |
| Dissolved solids in product liquor: | | | | | | | |
| Analysis, wt. percent: | | | | | | | |
| Carbon | | 27.1 | | 18.5 | 23.1 | 18.6 | |
| Hydrogen | 5.3 | 5.5 | | 4.9 | 4.3 | | |
| Sulfur | 6.7 | 13.2 | | 14.3 | 13.3 | 16.0 | |
| Nitrogen | 3.0 | 7.4 | | 9.5 | 7.6 | 9.4 | |
| Carbon dioxide | 1.3 | 1.8 | | 0.6 | 0.9 | 0.7 | |

*Chemical oxygen demand, grams per liter.

EXAMPLE 8

Product liquid from Example 5 was subjected to contact with air at a temperature of 550° F. and a pressure of 1500 p.s.i.g. for a period of 1 hour using 29 liters of air per liter of said product liquid. Treatment with air reduced the percentage of dissolved solids from 1.4 percent to 1.1 percent, reduced the COD from 15.9 grams oxygen per liter to 4.7 grams per liter, and increased the pH from 3 to 5.

It will be seen from the above examples that the present process effected a reduction in COD by 92.4 percent by the coking treatment alone and by 97.7 percent by the combined coking and air oxidation treatment.

EXAMPLES 9 to 11

Runs were made at preferred temperatures of 500° F. and 550° F. to determine the effect of time of heating on the extent of COD reduction. Solid residue was removed from the treated liquid by filtration with the addition of two parts water by weight per part treated liquid. Treating conditions and results are shown in Table 2.

TABLE 2

| Example No | 9 | 10 | 11 |
|---|---|---|---|
| Temperature, ° F | 500 | 550 | 550 |
| Pressure, p.s.i.g | 825 | 1,050 | 1,050 |
| Time, min | 20 | 10 | 20 |
| Treated liquid COD, g./l | 16.080 | 18.780 | 17.130 |
| Reduction, percent | 92.3 | 90.1 | 91.9 |

EXAMPLE 12

A spent ammonia based sulfite liquor secured from Boise-Cascade was coked in a manner similar to that set forth in Example 5. The treated waste liquor slurry was mixed with an equal volume of water and vacuum filtered. The tests and yield structure are set forth in Table 3 as follows:

TABLE 3

| | Charge | Treated waste liquor | Coke |
|---|---|---|---|
| Feed, wt. percent | 100 | 92 | 6 |
| COD, g./l | 153.5 | 6.9 | |
| Residue on evaporation, g./l | 114.25 | 6.174 | |
| Total volatile, g./l | 112.086 | 4.582 | |
| Fixed residue, g./l | 2.164 | 1.592 | |
| Carbon, wt., percent | 5.0 | | 63 |
| Nitrogen, wt., percent | 0.32 | 0.075 | |
| Sulfur, wt. percent | 0.34 | | 2.1 |
| Ash, wt. percent | | | 5.58 |
| pH | | 3.9 | |

It will be noted that the COD of the liquid was reduced by 95 percent. The liquid product was then treated at 550° F. with 15.0 liters (STP) of air per liter of liquid. By this treatment the COD was reduced to 193 mg./l. (0.193 g./l.) and the product had a pH of 1. This represents over 99.5 percent reduction in COD of the effluent.

EXAMPLES 13–17

Simulated cannery wastes were prepared separately from tomatoes, potato peelings, and orange peels in a Waring blendor forming water slurries which were subjected to treatment in accordance with the process described herein. The process conditions and results of these runs are shown in Table 4.

TABLE 4

| Example No. | 13 | 14 | 15 | 16 | 17 |
|---|---|---|---|---|---|
| Waste material | Orange | Orange | Potato | Potato | Tomato |
| Solids, wt. percent | 10.8 | 9.6 | 4.21 | 3.11 | 1.02 |
| COD, g./l. | 100 | 122 | 39.7 | 33.5 | 12.3 |
| Coking conditions: | | | | | |
| Temperature, °F. | 400 | 550 | 450 | 550 | 650 |
| Pressure, p.s.i.g. | 300 | 1,100 | 425 | 1,075 | 2,200 |
| Time, hrs. | 2 | 2 | 2 | 2 | 2 |
| Treated liquor: | | | | | |
| Feed, wt. percent | 89.7 | 88.5 | 97.0 | 98.0 | 96.0 |
| Dissolved solids, wt. percent | 2.08 | 0.44 | 1.16 | 0.66 | 0.35 |
| COD, g./l. | 29.2 | 26.9 | 14.8 | 10.3 | 9.0 |
| Coke: | | | | | |
| Feed, wt. percent | 7.4 | 4.1 | 1.7 | 0.9 | |
| Analysis, wt. percent: | | | | | |
| Carbon | 61.7 | 72.6 | 72.3 | 63.8 | |
| Hydrogen | 6.1 | 6.2 | 5.8 | 5.9 | |
| Nitrogen | 1.3 | 1.63 | 3.91 | 3.56 | |
| Phosphorus | 0.13 | 0.17 | 0.06 | 0.28 | |
| Potassium | 0.22 | 0.10 | 0.21 | 0.35 | |
| Carbon dioxide | 0.6 | 0.9 | | | |
| Ash | 3.1 | 2.48 | 0.27 | 12.6 | 0.17 |
| Heating value, B.t.u./lb. (×1,000) | 10.3 | 13.2 | | | |
| Oxidation conditions: | | | | | |
| Temperature, °F. | | 550 | 450 | 550 | 550 |
| Pressure,[1] p.s.i.g. | | | 1,000 | 1,800 | 1,700 |
| Time, hrs. | | | 2 | 2 | |
| Product liquor: | | | | | |
| pH | | | 4.2 | 4.0 | 9.0 |
| Dissolved solids, wt. percent | | 0.33 | 0.34 | 0.26 | 0.13 |
| COD, g./l. | | 4.2 | 5.2 | 0.8 | 5.2 |

[1] Oxidation tests were carried out in a bomb; pressure reported is maximum pressure observed.

The high ash observed in the coke from Example 16 is believed to be due to the presence of inorganic material, e.g. sand or dirt, in the potato peelings.

In the foregoing examples, and throughout the specification, the term "chemical oxygen demand," abbreviated "COD," is used in the usual sense. Thus COD denotes the total oxidizable material present in the liquid under consideration regardless of whether or not it is biodegradable. BOD tests, on the other hand, denote the amount of oxygen consumed during a five day period of bacterial activity at 20° C. on a chemically standardized and stabilized sample. Although COD is not strictly comparable to the biological oxygen demand (BOD), it is believed sufficiently useful as an indication of reduction of BOD to provide a basis for comparison of the effectiveness of alternate methods of treatment, particularly when applied to comparable waste samples.

We claim:
1. A process for treating aqueous organic waste liquor, consisting of preheating said liquor by indirect heat exchange with hot effluent from a subsequent air oxidation step; coking said preheated liquor in the absence of free oxygen in a heating zone at a temperature of about 400 to about 650° F. under a pressure of about 300 to about 3500 p.s.i.g. sufficient to prevent the evaporation of water therefrom; transferring said liquor to a separating zone; holding said liquor therein at the above-stated temperature and pressure ranges for a time sufficient to coke organic components present in said liquor thereby forming a coke-containing aqueous slurry, steam, gases and an effluent; separating said products; separating aqueous liquid from said slurry and combining said aqueous liquid with said effluent; and air-oxidizing the thus combined liquids under the temperature and pressure ranges above stated to yield a hot effluent having a reduced chemical oxygen demand.

2. The process as defined in claim 1, including the added step of further cooling said hot effluent to yield an aqueous liquid suitable for disposal in receiving bodies of water without polluting same.

3. The process as defined in claim 1, wherein said waste liquor is heated for a time ranging from about 10 minutes to about 2 hours.

4. The process as defined in claim 1 wherein said combined liquids are air oxidized for a time ranging from about one minute to about one hour.

5. The process as defined in claim 1 wherein said liquor is a sulfite process pulp waste liquor containing vegetable organic matter dissolved from wood.

6. The process as defined in claim 1 wherein said liquor is a cannery waste liquor containing carbohydrates.

7. The process as defined in claim 1 wherein said combined liquids are oxidized with about 10 to about 100 grams of air per liter of liquid.

References Cited

UNITED STATES PATENTS

| 2,752,243 | 6/1956 | Barton et al. | 162—31 |
| 3,037,901 | 6/1962 | Thomsen | 162—36X |
| 3,272,739 | 9/1966 | Earle et al. | 210—71X |
| 3,507,788 | 4/1970 | Cole et al. | 210—63 |

S. LEON BASHORE, Primary Examiner

A. L. CORBIN, Assistant Examiner

U.S. Cl. X.R.

159—47WL; 162—31, 36; 210—56, 63, 71